United States Patent [19]
> Cornaby

[11] 4,412,161
[45] Oct. 25, 1983

[54] DIGITAL CONTROL OF SERVO CIRCUIT
[75] Inventor: David T. Cornaby, Roy, Utah
[73] Assignee: Iomega Corporation, Ogden, Utah
[21] Appl. No.: 257,489
[22] Filed: Apr. 24, 1981
[51] Int. Cl.³ .......................................... G05B 13/00
[52] U.S. Cl. .................................. 318/561; 318/603; 360/75
[58] Field of Search ...................... 318/561, 600, 603; 360/75

[56] References Cited

U.S. PATENT DOCUMENTS 3,911,345 10/1975 Totten ................................ 318/561
4,064,444 12/1977 Hoang ................................ 318/561
4,353,019 10/1982 Sweeney, Jr. ................. 318/561 X

OTHER PUBLICATIONS

Abraham Peled and Bede Liu, "A New Hardware Realization of Digital Filters", IEEE Transactions on Acoustics, Speech and Signal Processing vol. AS-SP-22, No. 6, Dec. 1974.

Primary Examiner—B. Dobeck
Attorney, Agent, or Firm—Woodcock, Washburn, Kurtz, Mackiewicz & Norris

[57] ABSTRACT

Digital signal processing means useful in control of servo loops is disclosed. The servo loop is designed to interface with a microprocessor controlling the loop. In a preferred embodiment, in which the servo loop controls the motion of a read/write head with respect to a magnetic disk, plural previous control signals and output response signals are recursively summed to generate each next position signal. Coefficients for weighting the previous control and response signals are stored in a read only memory accessed by portions of the control and response signals.

5 Claims, 2 Drawing Figures

DIGITAL CONTROL OF SERVO CIRCUIT

FIELD OF THE INVENTION

This invention relates to a servo circuit in which digital signal processing techniques are used. More particularly, the invention relates to a servo circuit for the control of a read/write head juxtaposed to a magnetic disk wherein digital techniques are used to derive the position signals for the servo circuit.

BACKGROUND OF THE INVENTION

This invention relates generally to the field of servo circuits for controlling a motor moving an apparatus. The apparatus includes means for picking up signals indicative of the actual position of the apparatus which are used in deriving the control signals fed to the motor, thus completing a servo loop. The invention will be described with respect to a magnetic disk drive for the storage of digital data in which a servo loop is used to control the motion of the read/write head with respect to the disk surface, and wherein the read/write head picks up permanently encoded position information written on the magnetic disk. Such servo controls of disk drives are well known and typically involve analog filtering techniques to provide stability to the servo loop; that is, by filtering out resonant frequencies and the like. Such analog filtering techniques involve the difficulty that the filter means may be subject to component drift over time or with temperature change, and may therefore not be adequate to fully control the loop. Furthermore, analog filtering may not be compatible with the remainder of the signal processing used to derive the position control signal which may, in today's technology, comprise microprocessor means for generating the command signal. Accordingly, it would be desirable to provide improved filter and command signal processing means for use in a servo loop. In particular, one which could readily be interfaced with the means used to generate the control signals.

OBJECTS OF THE INVENTION

It is therefore an object of the invention to provide an improved servo circuit filtering means whereby component instabilities are eliminated.

A further object of the invention is to provide a servo circuit filtering method which operates using the same sorts of signals as does the control element providing the control signal.

A further object of the invention is to provide digital signal processing means for use in a servo loop.

SUMMARY OF THE INVENTION

The invention satisfies the above needs of the art and achieves the objects of the invention mentioned above by its provision of a digital signal processing technique for the filtering of signals in a servo loop. The digital signal processing circuit is fully compatible with a microprocessor used for calculation of the position control signal used as the control input to the servo loop. In a particularly preferred embodiment, precalculated coefficients to be applied to received servo signal information are stored in a read only memory (ROM). The results of the previous signals are then added recursively with the next command to derive an actual current command for input to the servo loop.

BRIEF DESCRIPTION OF THE DRAWINGS

The invention will be better understood if reference is made to the accompanying drawings, in which.

DESCRIPTION OF THE PREFERRED EMBODIMENTS

Figure 1:
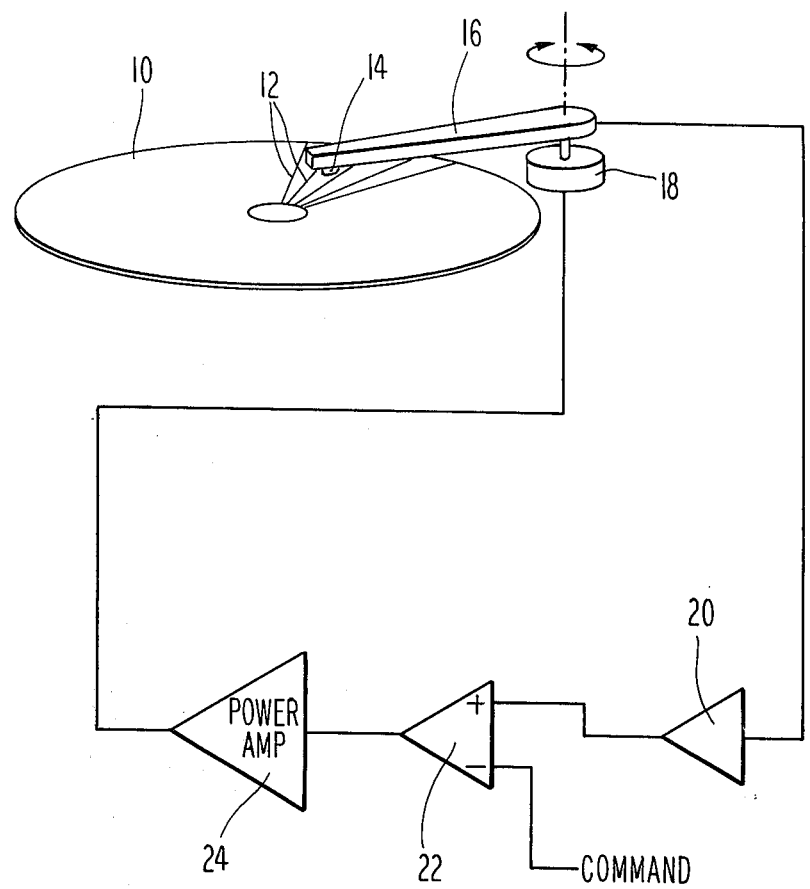
FIG. 1 represents a block diagram servo loop for controlling the position of a read/write head with respect to a magnetic disk.

As noted above, this invention is implemented in a magnetic disk drive having a servo circuit for controlling the motion of the read/write head with respect to the disk surface. FIG. 1 shows such a servo loop useful in the control of such a head. The magnetic disk 10 having permanently encoded position information 12 written thereon at the time of manufacture is rotated in juxtaposition to a magnetic read/write head 14 carried by a servo arm 16 rotatable about an axis by a servo motor 18. The position information detected by the head 14 is passed to an amplifier means 20 for preamplification and automatic gain control, and then is compared in a comparator 22 with a command signal generated in accordance with the present invention. The output of the comparator 22 is fed to a power amplifier 24 which powers the servo motor 18, thus completing the servo loop.

Control of the motion of the head 14 with respect to the disk 12 is relevant both as to keeping the head centered over a particular disk track once it has been located, and in controlling the motion of the head from one track to another, i.e., in a "seek" operation. Co-pending application Ser. No. 257,608, filed Apr. 27, 1981, shows how the servo circuit may produce signals indicative of the location of the head over the center of a given disk track while Ser. No. 257,484, filed Apr. 24, 1981, shows how the microprocessor generates the trajectory of the head during a seek operation. The centering information derived according to the first referred to co-pending application is then used to verify that the trajectory is followed accurately by the head. Both the above-mentioned co-pending applications are hereby incorporated by reference herein. The present invention relates to the detailed method whereby the microprocessor's output control signals are combined with actual servo information to yield a control signal.

It will be appreciated that in order for a track following servo system to be implemented using a digital filter a fast way must be found to execute the computations necessary to calculate the next servo signal. In a preferred embodiment, the computation implemented is symbolized by the equation:

$$I_0 = \sum_{i=0}^{4} P_i C_i + \sum_{i=1}^{5} I_i C_{i+4}$$

Where $I_0$ is the present output current sought to be calculated, $I_1$ is the next prior output current, and so on; $P_1$ is the last preceding detected input servo signal, $P_2$ the next preceding, and so on; and the $C_i$'s are coefficients calculated in accordance with the characteristics of the particular filter chosen.

Figure 2:
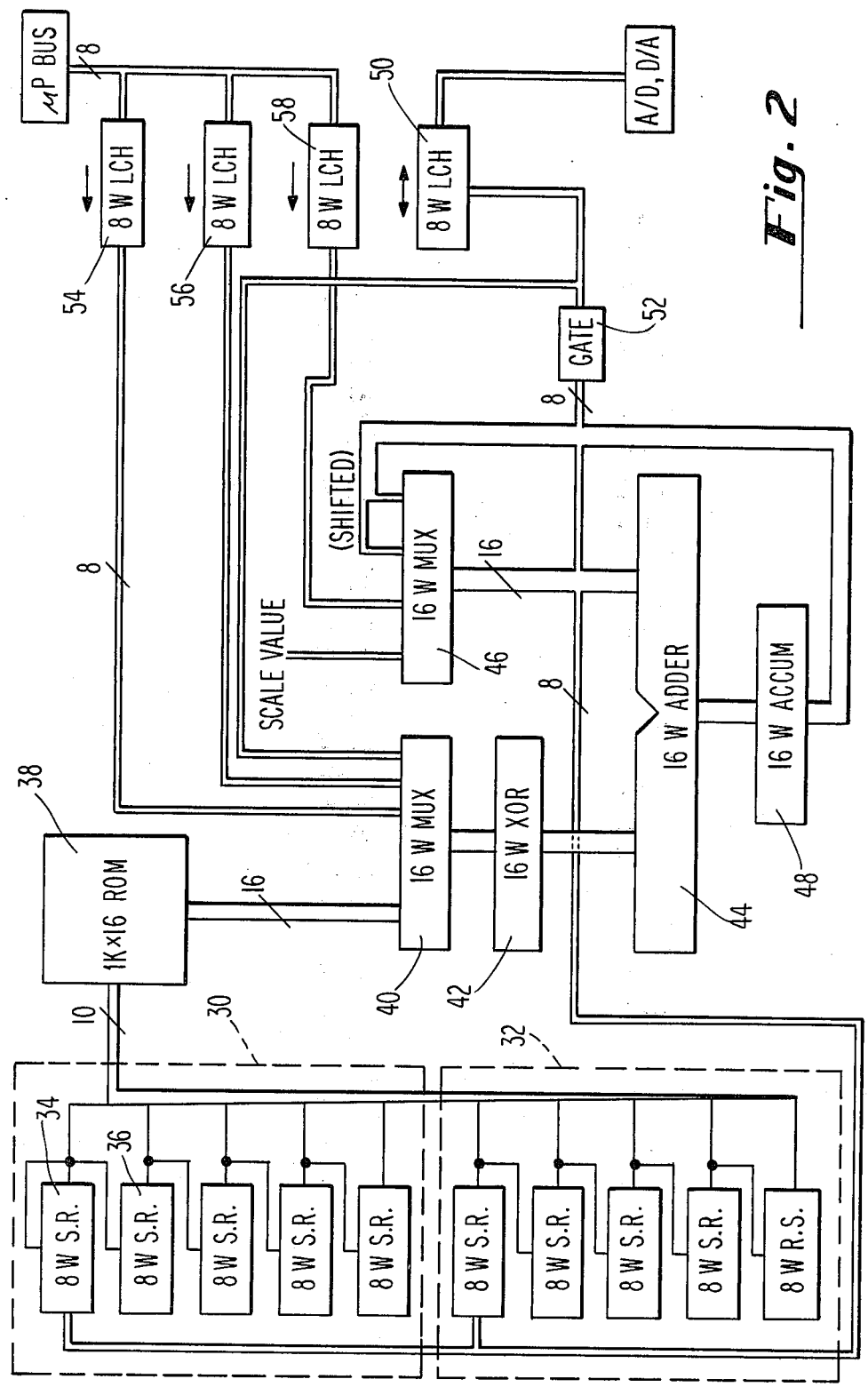
FIG. 2 shows a more detailed block diagram of the circuitry used to derive the command signal input to the servo loop of FIG. 1.

Reference will now be made to FIG. 2 to show specific circuitry implemented to perform the calculation symbolized by the equation above. The variables denoted by the I's and P's above are respectively loaded into two shift registers 30 and 32, each of which comprises five 8-bit shift registers. For example, the uppermost 8-bit shift register 34 comprised in the larger shift register 30 might contain $P_0$, $P_1$ could be stored in the next shift register 36, and so on. Similarly, the I's could be stored in shift register 32. The least significant bit of these shift registers is picked off to provide an address to a PROM 38 which is personalized with premultiplied coefficients particular to the filter being implemented, the $C_i$'s. The output of PROM 38 is then added recursively with other input values in a 16-bit multiplex unit 40, feeding a 16-bit exclusive-OR network 42. The output of this is fed to a 16-bit adder 44 where it is combined with the output of a second 16-bit multiplexor 46 which receives inputs from the microprocessor which is used, e.g., to calculate the head trajectory. The microprocessor provides inputs to the first 16-bit multiplexor 40 as well as the second 46, so that all of the position control information output by the microprocessor is eventually fed to the 16-bit adder 44, the output of which is latched in a 16-bit accumulator 48 and fed back into the second 16-bit multiplexor 46 to provide the recursive action necessary. The output of the second 16-bit multiplexor 46 is also fed back into the two shift registers 30 and 32 so as to continually supply new I's and P's as succeeding samples are received. The samples are brought into the 16-bit multiplexor 40 through an 8-bit transceiver 50. A gate 52 holds the output data until required by the transceiver 50, which is then fed to a digital-to-analog converter (not shown) used to control the input to the power amp 24 of FIG. 1. An analog-to-digital converter (not shown) is likewise used to gate the servo signals through the transceiver 50 prior to their being input to the 16-bit multiplexor 40. Finally, 8-bit latches 54, 56 and 58 hold the inputs from the microprocessor to the control circuit of FIG. 2 so that they are available when required by the multiplexors 40 and 46.

It will thus be appreciated that the circuit of FIG. 2 shows a way in which digital signals indicative of, for example, the departure of the read/write head from the center line of a receive track, as well as position signals commanding the read/write head to move from one track to another can effectively be combined and recursively added to previously input servo signals to provide a digital "smoothing" or "filtering" action to the servo signal. In this way the trajectory is rendered smoother, which is of advantage in the mechanical construction of the system. Further, the use of the digital filter and of the registers used to output the eventual control signal is desirable in that this circuit interfaces readily with the microprocessor used to generate the actual control signals and limits the amount of analog circuitry in the overall servo system to a minimum which is desirable in reducing component drift error and the like.

Those skilled in the art will likewise recognize that there are numerous modifications and improvements that can be made to the invention without departing from its essential spirit and scope, which is therefore not to be limited by the above exemplary disclosure, but only by the following claims.

I claim:

1. Servo apparatus comprising means for comparing a detected position signal to a command position signal, means for updating said command signal based on the result of said comparison means for recursive summation of plural previous command signals and previous detected position signals to yield a next command signal, memory means for storing coefficients, and means for weighting said previous command and/or detected position signals in said summing step in accordance with said coefficients stored in said memory means.

2. The apparatus of claim 1 further comprising means for addressing said memory means for access by picking off chosen bits from registers containing said previous command and detected position signals.

3. The apparatus of claim 1 further comprising a plurality of shift registers each capable of containing a single one of said previous position signals, said plurality of shift registers being ganged together such that each of said previous actual or calculated signals are passed through said ganged sequence of shift registers.

4. Method of calculating a control input to a servo loop, comprising the steps of inputting a series of control signals to said loop; generating the next succeeding control signals in accordance with the output response signals resulting from application of the previous control signals; recursively summing a plurality of previous control signals and of output response signals to generate each next control signal;

retrieving coefficients from memory means; and
weighting said previous control signals and detected output signals in accordance with said coefficients in said recursive summing operation.

5. The method of claim 4 further comprising the step of using predetermined bits of said previous input control and output response signals to address the memory means containing said coefficients.

* * * * *